United States Patent
Park

(10) Patent No.: US 9,992,754 B2
(45) Date of Patent: *Jun. 5, 2018

(54) METHOD AND APPARATUS FOR CONTROLLING TPC COMMAND TIMING CONSIDERING TDD-FDD CARRIER AGGREGATION

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/349,956

(22) Filed: Nov. 11, 2016

(65) Prior Publication Data

US 2017/0064648 A1 Mar. 2, 2017

Related U.S. Application Data

(63) Continuation of application No. 14/664,733, filed on Mar. 20, 2015, now Pat. No. 9,525,523.

(30) Foreign Application Priority Data

Mar. 21, 2014 (KR) .......................... 10-2014-0033580

(51) Int. Cl.
*H04W 52/04* (2009.01)
*H04W 72/04* (2009.01)
(Continued)

(52) U.S. Cl.
CPC ............. *H04W 52/34* (2013.01); *H04L 5/001* (2013.01); *H04L 5/0053* (2013.01);
(Continued)

(58) Field of Classification Search
CPC ..... H04L 5/001; H04L 5/0042; H04L 5/0053; H04L 5/0092; H04L 5/14; H04L 5/1469;
(Continued)

(56) References Cited

U.S. PATENT DOCUMENTS 9,276,691 B2 3/2016 Choi et al.
9,525,523 B2 * 12/2016 Park ..................... H04W 52/146
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213 V12.0.0, Dec. 2013, pp. 1-186, 3GPP.

*Primary Examiner* — Ahmed Elallam

(57) ABSTRACT

One or more exemplary embodiments provide a TPC command timing by taking into consideration TDD-FDD CA and cross-carrier scheduling, and provide a PUSCH transmission power controlling method in a subframe i for an FDD-based scheduled cell, based on the TPC command timing. According to one or more exemplary embodiments, an uplink transmission power may be effectively controlled when TDD-FDD CA and cross-carrier scheduling is configured for a UE. A Physical Uplink Shared Channel (PUSCH) transmission power control timing may be optimized.

23 Claims, 8 Drawing Sheets

(51) Int. Cl.
*H04W 52/14* (2009.01)
*H04W 52/34* (2009.01)
*H04W 72/12* (2009.01)
*H04L 5/00* (2006.01)
*H04L 5/14* (2006.01)

(52) U.S. Cl.
CPC .............. *H04L 5/0092* (2013.01); *H04L 5/14* (2013.01); *H04L 5/1469* (2013.01); *H04W 52/146* (2013.01); *H04W 72/042* (2013.01); *H04W 72/1263* (2013.01)

(58) Field of Classification Search
CPC ........ H04L 5/26; H04W 52/04; H04W 52/34; H04W 52/40; H04W 52/58; H04W 52/146; H04W 72/0413; H04W 72/042; H04W 72/12; H04W 72/0446; H04W 72/1263; Y02B 60/50
See application file for complete search history.

(56) References Cited

U.S. PATENT DOCUMENTS

| | | | |
|---|---|---|---|
| 9,706,568 B2* | 7/2017 | Ekpenyong | H04W 72/14 |
| 9,853,779 B2* | 12/2017 | Yin | H04L 1/1887 |
| 9,877,311 B2* | 1/2018 | Yang | H04W 72/0413 |
| 2012/0257552 A1 | 10/2012 | Chen et al. | |
| 2014/0293893 A1 | 10/2014 | Papasakellariou et al. | |
| 2015/0003302 A1 | 1/2015 | Ekpenyong | |
| 2015/0016315 A1 | 1/2015 | Yang et al. | |
| 2015/0023229 A1 | 1/2015 | Yin et al. | |
| 2015/0085718 A1 | 3/2015 | Chen et al. | |
| 2015/0117275 A1 | 4/2015 | Park | |
| 2015/0124670 A1 | 5/2015 | Park | |
| 2015/0181590 A1 | 6/2015 | Park | |
| 2016/0174212 A1* | 6/2016 | Yang | H04L 5/001 370/330 |
| 2016/0204906 A1 | 7/2016 | Cheng et al. | |

* cited by examiner

METHOD AND APPARATUS FOR CONTROLLING TPC COMMAND TIMING CONSIDERING TDD-FDD CARRIER AGGREGATION

CROSS-REFERENCE TO RELATED APPLICATIONS

This application is a continuation of and claims priority to U.S. patent application Ser. No. 14/664,733, filed on Mar. 20, 2015, and claims priority from and the benefit of Korean Patent Application No. 10-2014-0033580, filed on Mar. 21, 2014, each of which is hereby incorporated by reference in its entirety.

BACKGROUND

1. Field

Exemplary embodiments relate to wireless communication, and more particularly, to a method and apparatus for controlling a timing of a Transmit Power Control (TPC) command considering Time Division Duplex (TDD)-Frequency Division Duplex (FDD) Carrier Aggregation (CA).

2. Discussion of the Background

A Transmission Power Control (TPC) refers to a technology to overcome the near-far problem caused when terminals are distributed near or far from a base station and perform signal transmission. When it is assumed that all the terminals transmit a signal with the same power, the intensity of a signal transmitted by a terminal located near the base station may be higher than that of a signal transmitted from a terminal located far from the base station. Therefore, the terminal located near the base station has no problem calling, but the terminal located far from the base station experiences a relatively strong interference. Therefore, the TPC refers to a technology that adjusts a transmission power of each terminal so that a base station receives a signal with power of a regular intensity. A base station may transmit a TPC command to a terminal for transmission power control. The TPC command may be applied to a predetermined subframe.

The wireless communication system may support Frequency Division Duplex (FDD) and Time Division Duplex (TDD). In the FDD, a carrier used for an uplink (UL) transmission and a carrier used for a downlink (DL) transmission exist, respectively, and both the UL transmission and the DL transmission are simultaneously executed in a cell. In the TDD, a UL transmission and a DL transmission are distinguished from each other, based on a time, in a single cell. In the TDD, an identical carrier may be used for a UL transmission and a DL transmission Thus, a base station and a UE repeatedly execute conversions between a transmission mode and a reception mode. The TDD includes a special subframe so as to provide a guard time for converting a mode between transmission and reception. The special subframe may include a Downlink Pilot Time Slot (DwPTS), a Guard Period (GP), and an Uplink Pilot Time Slot (UpPTS). For the TDD, through various UL-DL configurations, resources may be asymmetrically allocated for UL and DL transmissions.

Currently, frequency resources are scarce and various technologies are used in a part of the broad frequency bands. For this reason, to satisfy a higher data transmission rate requirement, as a scheme for securing a broadband bandwidth, each scattered band is designed to satisfy basic requirements for operating an independent system and a Carrier Aggregation (CA) has been employed, which binds up a plurality of bands as a single system. A band or a carrier that may independently operate may be defined as a Component Carrier (CC). Further, a TDD-FDD CA supports a CA of an FDD carrier and a TDD carrier.

In particular, when cross-carrier scheduling between a TDD carrier and an FDD carrier is configured for a terminal, a timing that is different from an existing scheduling timing and a Hybrid Automatic Repeat Request (HARQ)-Acknowledgement (ACK) timing may be applied to the terminal. Therefore, when the existing timing of a TPC command that was applied for a terminal that is connected with a FDD carrier or a TDD carrier, is applied, an uplink power control is erroneously indicated with respect to a subframe where a terminal does not execute uplink transmission, a power control based on an erroneous value may be indicated, or the like. To overcome the above described drawbacks, the present invention provides a new timing of a TPC command, considering TDD-FDD CA, and provides a PUSCH transmission power controlling method based on the same.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments provide a method and apparatus for controlling a timing of a TPC command considering TDD-FDD Carrier Aggregation.

One or more exemplary embodiments provide a method of receiving a transmit power control (TPC) command in a wireless communication system supporting Time Division Duplex (TDD)-Frequency Division Duplex (FDD) Carrier Aggregation (CA), the method including: establishing a Radio Resource Control (RRC) connection with a base station through a first serving cell, the first serving cell supporting a TDD mode; receiving, at a UE, an RRC message through the first serving cell, the RRC message including carrier aggregation (CA) configuration information, the CA configuration information including information of a second serving cell supporting an FDD mode, and the first serving cell and the second serving cell being aggregated by a TDD-FDD CA scheme; detecting, at the UE, a Physical Downlink Control Channel (PDCCH) transmitted through the first serving cell, the PDCCH including a TPC command and being received in a subframe n−4; and transmitting, from the UE, a Physical Uplink Shared Channel (PUSCH) associated with the TPC command through the second serving cell, the PUSCH being transmitted in a subframe n.

One or more exemplary embodiments provide a method of controlling a transmit power control (TPC) command in a wireless communication system supporting Time Division Duplex (TDD)-Frequency Division Duplex (FDD) Carrier Aggregation (CA), the method including: establishing a Radio Resource Control (RRC) connection with a User Equipment (UE) through a first serving cell, the first serving cell supporting a TDD mode; transmitting, from a base station to the UE, an RRC message through the first serving cell, the RRC message including carrier aggregation (CA) configuration information, the CA configuration information including information of a second serving cell supporting an FDD mode, and the first serving cell and the second serving cell being aggregated by a TDD-FDD CA scheme; determining a transmit power of a Physical Uplink Shared Channel (PUSCH) transmission of the UE; transmitting, to the UE, a Physical Downlink Control Channel (PDCCH) through the first serving cell, the PDCCH including a TPC command and being transmitted in a subframe n−4; and receiving, from the UE, the PUSCH associated with the TPC command through the second serving cell, the PUSCH being transmitted in a subframe n.

According to one or more exemplary embodiments, an uplink transmission power may be effectively controlled when TDD-FDD CA and cross-carrier scheduling is configured for a User Equipment (UE). In particular, according to one or more exemplary embodiments, a Physical Uplink Shared Channel (PUSCH) transmission power control timing may be optimized.

BRIEF DESCRIPTION OF THE DRAWINGS

FIG. 5 is a diagram illustrating an example of an uplink scheduling timing and a TPC command timing for an SCell #2 of a UE for which CA of a FDD-based PCell, a TDD-based SCell #1, and a FDD-based SCell #2 is configured and cross-carrier scheduling is configured over the TDD-based SCell #1, according to one or more exemplary embodiments.

FIG. 6 is a diagram illustrating an example of an uplink scheduling timing and a TPC command timing according to one or more exemplary embodiments.

DETAILED DESCRIPTION OF THE ILLUSTRATED EMBODIMENTS

Figure 1:
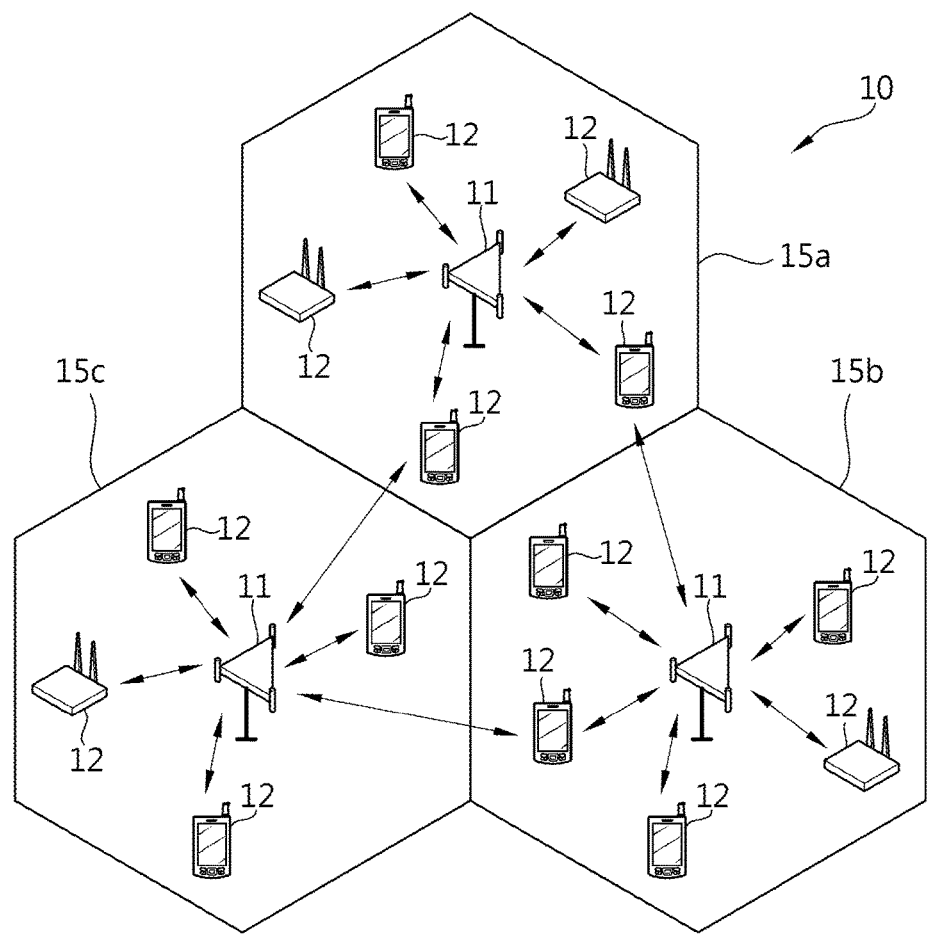
FIG. 1 is a block diagram illustrating a wireless communication system according to one or more exemplary embodiments.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

Further, the description herein is related to a wireless communication network, and an operation performed in a wireless communication network may be performed in a process of controlling a network and transmitting data by a system that controls a wireless network (e.g., a base station) or may be performed in a user equipment connected to the wireless communication network.

FIG. 1 is a diagram illustrating a wireless communication system according to one or more exemplary embodiments.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15a, 15b, and 15c. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 MHz bandwidth, it can support 100 MHz bandwidth at maximum.

CA may be divided as contiguous carrier aggregation, which is made among continuous CCs, and non-contiguous carrier aggregation, which is made among non-continuous CCs. The number of carriers aggregated between uplink and downlink may be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) may be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) may be aggregated together.

Hereinafter, a multiple carrier system includes the system that supports carrier aggregation. Contiguous CA and/or non-contiguous CA may be used in the multiple carrier system; in addition, both symmetric aggregation and asymmetric aggregation may be used in the multiple carrier system as well. A serving cell may be defined as a component frequency band based on multiple CC system which may be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell may be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to an SCell refers to a DL Secondary Component Carrier (SCC), and an uplink component carrier corresponding to an SCell refers to a UL SCC. Only DL CC or UL CC may correspond to a serving cell, or a DL CC and an UL CC together may correspond to a serving cell.

Figure 2:
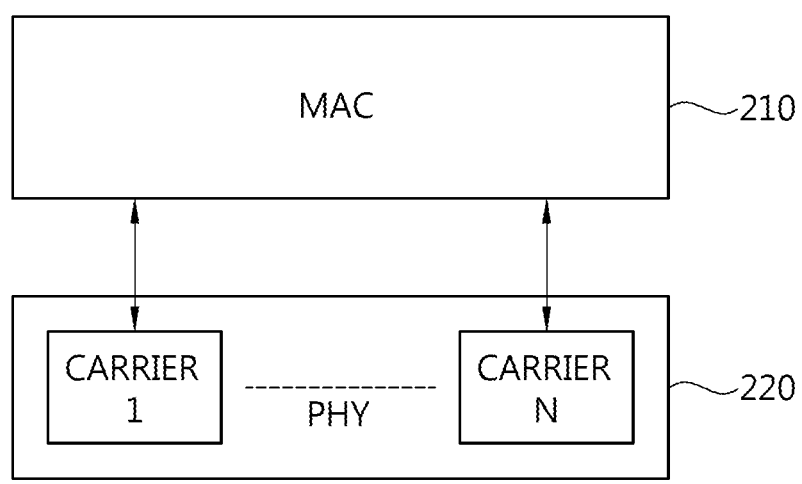
FIG. 2 illustrates an example of a protocol structure for supporting a multi-carrier system according to one or more exemplary embodiments.

FIG. 2 is a diagram illustrating an example of a protocol structure for supporting a multi-carrier system according to one or more exemplary embodiments.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

There are some physical control channels used in physical layer 220. As a DL physical channel, a Physical Downlink Control Channel (PDCCH) informs to a UE with regard to resource allocation of a Paging Channel (PCH) and a Downlink Shared Channel (DL-SCH), and a Hybrid Automatic Repeat Request (HARQ) information related to a DL-SCH. The PDCCH may carry uplink grant which informs a resource allocation of uplink transmission to a UE. The DL-SCHO is mapping to a Physical Downlink Shared Channel (PDSCH). A Physical Control Format Indicator Channel (PCFICH), which transmits every sub-frame, informs the number of OFDM symbols used on the PDCCHs to a user equipment. A Physical Hybrid ARQ Indicator Cannel (PHICH), as a DL channel, carries the HARQ ACK/NACK signals as a response to uplink transmission. As a UL physical channel, Physical Uplink Control Channel (PUCCH) may carry UL controlling information such as ACK(Acknowledgement)/NACK(Non-acknowledgement) or Channel Status Information (CSI) which includes Channel Quality Indicator (CQI), Precoding Matrix Index (PMI), Precoding Type Indicator (PTI) or Rank Indication (RI). The Physical Uplink Shared Channel (PUSCH) carries the Uplink Shared Channel (UL-SCH). The Physical Random Access Channel (PRACH) carries random access preamble.

A plurality of the PDCCH may be transmitted in the controlled region, and a user equipment can monitor a plurality of the PDCCH. The PDCCH is transmitted on either one Control Channel Element (CCE) or an aggregation of several consecutive CCEs. The CCE is a logical allocation unit used to provide PDCCH with a code rate based on the state of radio channel. The CCE corresponds to a plurality of Resource Element Groups. The format of the PDCCH and the number of available bits for the PDCCH are determined according to the relationship between the number of CCEs and a code rate provided by the CCEs.

Control information carried on the PDCCH is referred to as Downlink Control Information (DCI). The following table 1 shows DCI pursuant to several formats.

TABLE 1

| DCI Format | Description |
| --- | --- |
| 0 | Used for PUSCH scheduling in uplink cell |
| 1 | Used for one PDSCH codeword scheduling in one cell |
| 1A | Used for brief scheduling of one PDSCH codeword in one cell or random access process initialized by the PDCCH command |
| 1B | Used for a brief scheduling of one PDSCH codeword with precoding information in one cell |
| 1C | Used for one PDSCH codeword brief scheduling in one cell or the notification of MCCH change |
| 1D | Used for a brief scheduling of one PDSCH codeword in one cell including precoding or power offset information |
| 2 | Used for the PDSCH scheduling of the user equipment configured of spatial multiplexing mode. |
| 2A | Used for the PDSCH scheduling of the user equipment configured of large delay CDD mode |
| 2B | Used in the transmission mode 8 (a double layer transmission, etc) |
| 2C | Used in the transmission mode 9 (a multi layer transmission) |
| 2D | Used in the transmission mode 10 (CoMP) |
| 3 | Used for the transmission of TPC commands for PUCCH and PUSCH including 2-bit power adjustment |

TABLE 1-continued

| DCI Format | Description |
|---|---|
| 3A | Used for the transmission of TPC commands for PUCCH and PUSCH including single-bit power adjustment |
| 4 | Used for the PUSCH scheduling in the uplink multi-antenna port transmission cell |

Referring to Table 1, There are DCI formats such as format 0 used for the PUSCH scheduling in uplink cell, format 1 used for one PDSCH codeword scheduling in one cell, format 1A used for compact scheduling of one PDSCH codeword, format 2 used for the PDSCH scheduling in closed-loop spatial multiplexing mode, format 2B used for the PDSCH scheduling in open-loop spatial multiplexing mode, format 2B used in the transmission mode 8, format 2C used in the transmission mode 9, format 2D used in the transmission mode 10, format 3 and 3A used for the uplink transmission of TPC commands for the PUCCH and the PUSCH, and format 4 used for the PUSCH scheduling in the uplink multi-antenna port transmission cell.

Each field of DCI is sequentially mapped to n number of information bits $a_0$ or $a_{n-1}$. For example, the DCI is mapped to a total length of 44 bits of information bits, each field of DCI is mapped sequentially to $a_0$ or $a_{43}$. DCI formats 0, 1A, 3, 3A may have the same payload size. DCI format 0, 4 may be referred to as the Uplink grant (UL grant).

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH may be transmitted through different DL CCs, and the PUSCH may be transmitted through a UL CC other than a UL CC linked to a DL CC on which a PDCCH including a UL grant is transmitted.

During cross-carrier scheduling, a user equipment only receives scheduling information (such as UL grant) through a serving cell (or CC). Hereinafter, a serving cell (or CC) performing cross-carrier scheduling may refer to scheduling cell (or CC), and a serving cell being scheduled by scheduling cell (or CC) may refer to scheduled cell (or CC). Scheduling cell may refer to ordering cell, and scheduled cell may refer to following serving cell. For example, a scheduled cell may be scheduled by a scheduling cell. Scheduling information for the scheduled cell may be received through the scheduling cell.

As such, in a system supporting the cross-carrier scheduling, a carrier indicator is necessary to report which DL CC/UL CC was used to transmit the PDCCH/EPDCCH which indicates the PDSCH/PUSCH transmission. A field including the carrier indicator is hereinafter called a carrier indication field (CIF). Hereinafter, configuration of CIF may mean that configuration of cross-carrier scheduling.

The aforementioned cross-carrier scheduling may be classified into the DL cross-carrier scheduling and UL cross-carrier scheduling. The DL cross-carrier scheduling implies a case where the CC for transmitting the PDCCH/EPDCCH including resource allocation information for the PDSCH transmission and other information is different from a CC for transmitting the PDSCH. The UL cross-carrier scheduling implies a case where a CC for transmitting the PDCCH/EPDCCH including a UL grant for the PUSCH transmission is different from the DL CC linked to the UL CC for transmitting the PUSCH.

Figure 3:
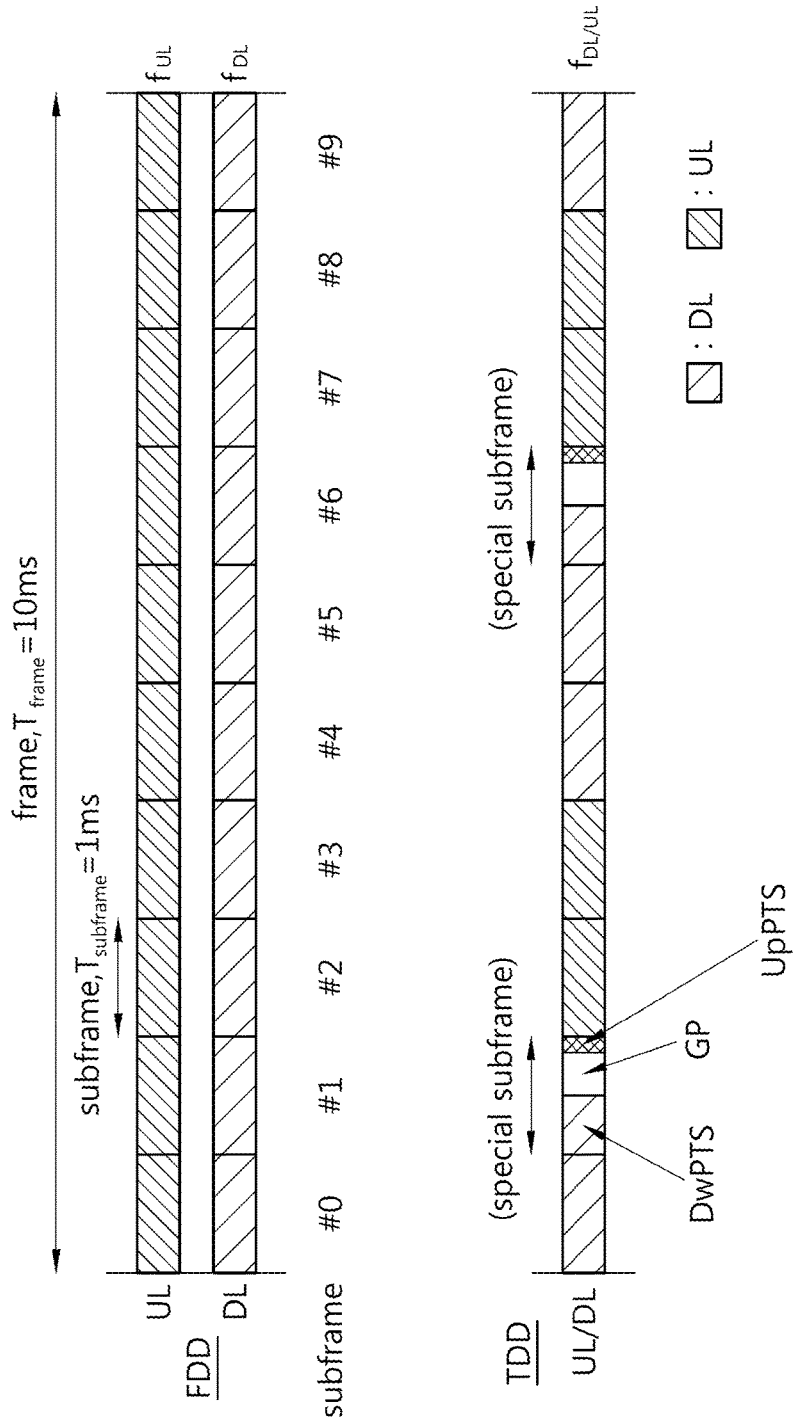
FIG. 3 illustrates an example of a radio frame structure according to one or more exemplary embodiments. This includes an FDD radio frame structure and a TDD radio frame structure.

FIG. 3 is a diagram illustrating an example of a radio frame structure according to one or more exemplary embodiments. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission may be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe may be placed to provide a guard time which is for switching mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 2 shows an example of UL-DL configuration of radio frame. UL-DL configuration defines reserved subframe for UL transmission or reserved subframe for DL transmission. That is, UL-DL configuration informs the rules how the uplink and the downlink are allocated (or reserved) in every subframe of one radio frame.

TABLE 2

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | D | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | D | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | D | D | S | U | U | D |

In Table 2, 'D' denotes a DL subframe, 'U' denotes a UL subframe, and 'S' denotes a special subframe. As shown to Table 2, subframe 0 and 5 are always allocated to DL transmission, and subframe 2 is always allocated to UL-transmission. As shown to Table 2, each UL-DL configuration has a different number and position of DL subframe and UL subframe in one radio frame. Through diverse UL-DL configuration, the amount of resource allocated to UL-DL transmission may be given asymmetrically. To avoid severe interference between UL and DL among cells, neighboring cells generally have same UL-DL configuration.

The point changing from DL to UL or the point changing from UL to DL is referred to as the switching point. The switch-point periodicity, which is either 5 ms or 10 ms, means a repeating period of the same changing aspect between the UL subframe and DL subframe. For example, referring to the UL-DL configuration 0, subframe from 0 to 4 changes D→S→U→U→U, subframe from 5 to 9 changes, as same as before, D→S→U→U→U. Since one subframe is 1 ms, the switch-point periodicity is 5 ms. That is, the switch-point periodicity is shorter than the length of one radio frame (10 ms), the changing aspect in the radio frame is repeated for one time.

The UL-DL configuration in above Table 2 may be transmitted from a base station to a user equipment through system information. The base station may inform a UL-DL allocation status change in a radio frame to a UE by transmitting the index of the UL-DL configuration whenever the UL-DL configuration changes. Or the UL-DL configuration may be control information which is transmitted to every UE in the cell through broadcast channel.

The setting of a transmission power of a UE for a PUSCH transmission may be defined as follows.

When a UE transmits a PUSCH and a PUCCH at different times for a serving cell c (If the UE transmits PUSCH without a simultaneous PUCCH for the serving cell c), $P_{PUSCH,c}(i)$ that is a UE transmission power for a PUSCH transmission in a subframe i for the serving cell c may be given as in Equation 1, provided below.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \text{[dBm]} \quad \text{[Equation 1]}$$

When the UE simultaneously transmits a PUSCH and a PUCCH for the serving cell c, $P_{PUSCH,c}(i)$ that is the UE transmission power for the PUSCH transmission in the subframe i for the serving cell c may be given as in Equation 2, provided below.

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \text{[dBm]} \quad \text{[Equation 2]}$$

When the UE does not transmit a PUSCH for the serving cell c, for the accumulation of a TPC command received with DCI format 3/3A for the PUSCH (if the UE is not transmitting PUSCH for the serving cell c, for the accumulation of TPC command received with DCI format 3/3A for PUSCH), the UE assumes that $P_{PUSCH,c}(i)$ that is the UE transmission power for the PUSCH transmission in the subframe i for the serving cell c is computed by Equation 3, provided below.

$$P_{PUSCH,c}(i) = \min\{P_{CMAX,c}(i), P_{O\_PUSCH,c}(1) + \alpha_c(1) \cdot PL_c + f_c(i)\} \text{ [dBm]} \quad \text{[Equation 3]}$$

Here, $P_{CMAX,c}(i)$ is a maximum UE transmission power configured for the serving cell c, and $\hat{P}_{CMAX,c}(i)$ is a linear value of $P_{CMAX,c}(i)$.

$\hat{P}_{PUCCH}(i)$ is a linear value of $P_{PUCCH}(i)$. $P_{PUCCH}(i)$ is a PUCCH transmission power in a subframe i.

In addition, $M_{PUSCH,c}(i)$ denotes a value that expresses the bandwidth of PUSCH resource assignment as the number of RBs available in a subframe i for the serving cell c.

In addition, $P_{O\_PUSCH,c}(j)$ is a sum of $P_{O\_NOMINAL\_PUSCH,c}(j)$ and $P_{O\_UE\_PUSCH,c}(j)$ for the serving cell c, and a value of j as 0 or 1 is provided from a higher layer. In the case of a semi-persistent grant PUSCH transmission (or retransmission), j is 0. In the case of a dynamic scheduled grant PUSCH transmission (or retransmission), j is 1. In the case of a random access response grant PUSCH transmission (or retransmission), j is 2. In addition, in the case of a random access response grant PUSCH transmission (or retransmission), $P_{O\_UE\_PUSCH,c}(2)=0$, and $P_{O\_NOMINAL\_PUSCH,c}(2)$ is a sum of $P_{O\_PRE}$ and $\Delta_{PREAMBLE\_Msg3}$. Here, parameters, $P_{O\_PRE}$(preambleInitialReceivedTargetPower) and $\Delta_{PREAMBLE\_Msg3}$ may be signaled from a higher layer.

When j is 0 or 1, one of the values in $\alpha_c \in \{0, 0.4, 0.5, 0.6, 0.7, 0.8, 0.9, 1\}$ may be selected based on a 3 bit-parameter transferred from a higher layer. When j is 2, $\alpha_c(j)=1$, always.

$PL_c$ is a downlink path loss (PL or a pass offset) estimation value for the serving cell c, calculated by a UE and expressed in dB, and may be calculated from "referenceSignalPower−higher layer filtered RSRP". Here, referenceSignalPower is a value provided from a higher layer, and corresponds to an Energy Per Resource Element (EPRE) value of a downlink reference signal, expressed in dBm. A Reference Signal Received Power (RSRP) is a reception power value of a reference signal with respect to a reference serving cell. A serving cell selected as a reference serving cell and determination of referenceSignalPower and higher layer filtered RSRP to be used for calculation of the $PL_c$, may be configured based on pathlossReferenceLinking, which is a higher layer parameter. Here, reference serving cell configured by pathlossReferenceLinking may be a PCell or a DL SCC of an SCell that has a SIB2 connection with (that corresponds to) a ULCC.

In addition, $\Delta_{TF,c}(i)$ is a parameter for reflecting an effect of a Modulation Coding Scheme (MCS), and the value is $10\log_{10}((2^{BPRE \cdot K_s}-1) \cdot \beta_{offset}^{PUSCH})$. Here, $K_s$ is given by a deltaMCS-Enabled parameter that is provided from a higher layer, for each serving cell c, and has a value of 1.25 or 0. Particularly, in the case of transmission mode 2 which is a mode for transmit diversity, $K_s$ is always 0. In addition, when only control information is transmitted through a PUSCH without UL-SCH data, BPRE=$O_{CQI}/N_{RE}$. For the rest, $$BPRE = \sum_{r=0}^{C-1} K_r \cdot N_{RE}.$$

C denotes the number of code blocks, $K_r$ denotes a size of a code block, $O_{CQI}$ denotes the number of CQI/PMI bits including the number of CRC bits, and $N_{RE}$ denotes the number of determined resource elements (that is, $N_{RE}=M_{sc}^{PUSCH-initial} \cdot N_{symb}^{PUSCH-initial}$). $M_{sc}^{PUSCH-initial}$ denotes the number of subcarriers for an initial PUSCH transmission with respect to an identical transport block, and $N_{Symb}^{PUSCH-initial}$ denotes the number of SC-FDMA symbols per subframe for an initial PUSCH transmission with respect to an identical transport block. In addition, when only control information is transmitted through a PUSCH without UL-SCH data, it is set that $\beta_{offset}^{PUSCH}=\beta_{offset}^{CQI}$. For the rest, $\beta_{offset}^{PUSCH}$ is always set to 1.

In addition, $\delta_{PUSCH,c}$ is a correction value, and also referred to as a "TPC command". $\delta_{PUSCH,c}$ may be included in a PDCCH/EPDCCH with DCI format 0 or 4 (0/4) for the serving cell c, or may be jointly coded with other TPC commands in a PDCCH with DCI format 3/3A. The DCI format 3/3A may be determined by only UEs for which an RNTI value is allocated, since CRC parity bits are scrambled with TPC-PUSCH-RNTI. Table 3 provided below indicates mapping of an accumulated or absolute TPC value and a TPC command field in DCI format 0/3/4, and Table 4 provided below indicates mapping an absolute TPC value and a TPC command field in DCI format 3A.

TABLE 3

| TPC Command Field In DCI format 0/3/4 | Accumulated $\delta_{PUSCH,c}$ [dB] | Absolute $\delta_{PUSCH,c}$ [dB] only DCI format 0/4 |
| --- | --- | --- |
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
| --- | --- |
| 0 | −1 |
| 1 | 1 |

A PUSCH power control adjustment state for a current serving cell c may be given as $f_c(i)$.

In the case of an accumulation mode: When accumulation is enabled by an accumulation-enabled higher layer for a serving cell c, based on an accumulation-enabled parameter provided from higher layers, or when a TPC command $\delta_{PUSCH,c}$ is included in a PDCCH/EPDCCH with DCI format 0 of which CRC is scrambled by a temporary C-RNTI, $f_c(i)$ may be given as in Equation 4, provided below.

$$f_c(i) = f_c(i-1) + \delta_{PUSCH,c}(i-K_{PUSCH}) \quad \text{[Equation 4]}$$

In the case of an absolute mode; When accumulation is not enabled for a serving cell c, based on an accumulation-enabled parameter provided by higher layers, $f_c(i)$ may be given as in Equation 5, provided below.

$$f_c(i) = \delta_{PUSCH,c}(i-K_{PUSCH}) \quad \text{[Equation 5]}$$

Here, $\delta_{PUSCH,c}(i-K_{PUSCH})$ is a TPC command in DCI format 0/4 or 3/3A in a PDCCH that was transmitted in an $(i-K_{PUSCH})^{th}$ subframe, and $f_c(0)$ is a first value after resetting of accumulation.

With respect to FDD, $K_{PUSCH}$ is 4.

With respect to FDD, when a UE is configured with one or more serving cells, and TDD UL/DL configurations of at least two configured serving cells are different, "TDD UL/DL configuration" for a serving cell c refers to a UL reference UL/DL configuration.

For TDD UL/DL configurations 1 to 6, $K_{PUSCH}$ is given in Table 5, provided below.

TABLE 5

| TDD UL/DL Configuration | subframe number i | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Table 5 lists $K_{PUSCH}$, which is an index indicating a subframe number (or index) and a timing of a TPC command based on and a TDD UL/DL configuration. Here, in connection with $K_{PUSCH}$, when a PUSCH is transmitted in a subframe i for a current serving c, a PUSCH power control adjustment state $f_c(i)$ for the PUSCH transmission is calculated based on a TPC command that was transmitted in an $(i-K_{PUSCH})^{th}$ subframe. For example, when a TDD UL/DL configuration of the serving cell c is 1 and a UE transmits a PUSCH in a subframe #9(i=9) of the serving cell c, the PUSCH transmission power control for the PUSCH transmission may be executed based on a TPC command that was transmitted in the $(i-K_{PUSCH})^{th}$ of the serving cell c.

In connection with the TDD UL/DL configuration 0, when a PUSCH transmission in a subframe 2 or 7 is scheduled with a PDCCH/EPDCCH of DCI format 0/4, and a Least Significant Bit (LSB) value of a UL index in the DCI format 0/4 is set to 1, $K_{PUSCH}$ is 7.

With respect to all other PUSCH transmissions, $K_{PUSCH}$ is given in Table 3, provided above.

Recently, CA of a FDD carrier and a TDD carrier is considered.

Figure 4:
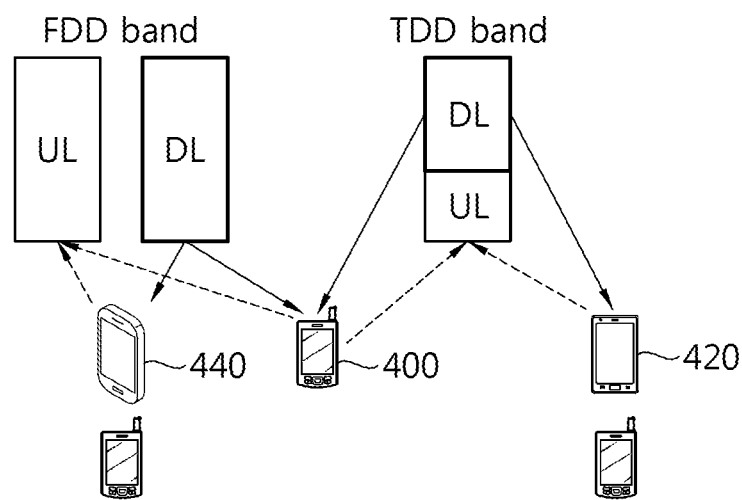
FIG. 4 illustrates a case of an inter-band CA of serving cells having different TDD UL-DL configurations according to one or more exemplary embodiments.
Figure 4:

FIG. 4 illustrates an example in which a FDD-TDD CA is configured for a UE in a network according to one or more exemplary embodiments.

Referring to FIG. 4, a legacy TDD terminal 420 receives a wireless communication service only through a TDD band, and a legacy FDD terminal 440 receives a wireless communication service only through a FDD band. Conversely, a FDD-TDD CA capable UE 400 receives a wireless communication service through a FDD band and a TDD band, and may also receive a CA-based wireless communication service through a TDD band carrier and a FDD band carrier.

The following points need to be taken into consideration, in association with scheduling and HARQ-ACK timing when TDD-FDD CA is configured.

(1) When a FDD cell is a PCell

A DL cross-carrier scheduling may be allowed. When a PUCCH is transmitted on only a PCell and a DL cross-carrier scheduling is configured, a DL HARQ-ACK timing for a scheduled serving cell uses a timing of the PCell.

In the case of a UL cross-carrier scheduling in which a scheduling serving cell is FDD and a scheduled serving cell is TDD, a UL scheduling/HARQ-ACK timing for a TDD scheduled serving cell uses a UL/DL configuration of the TDD scheduled serving cell.

In the case of a UL cross-carrier scheduling in which a scheduling serving cell is TDD and a scheduled serving cell is FDD, a UL scheduling/HARQ-ACK timing for the FDD scheduled serving cell is configured as follows. First, the timing has a Round Trip Time (RTT) of 10 ms, has an interval of 4 ms between a UL grant/PHICH and a PUSCH transmitted based on the same, and has an interval of 6 ms between a PUSCH and a PHICH transmitted based on the same.

(2) When TDD PCell Self Scheduling is Supported

For a TDD PCell, DL cross-carrier scheduling is allowed.

For cross-carrier scheduling of a PUCCH only on a PCell, a DL HARQ-ACK timing of a scheduled serving cell uses a timing of the PCell.

In the case of a UL cross-carrier scheduling in which a scheduling serving cell is FDD and a scheduled serving cell is TDD, a UL scheduling/HARQ-ACK timing for a TDD scheduled serving cell uses a UL/DL configuration of the TDD scheduled serving cell.

In the case of a UL cross-carrier scheduling in which a scheduling serving cell is TDD and a scheduled serving cell is FDD, a UL scheduling/HARQ-ACK timing for the FDD scheduled serving cell is configured as follows. First, the timing has a Round Trip Time (RTT) of 10 ms, has an interval of 4 ms between a UL grant/PHICH and a PUSCH transmitted based on the same, and has an interval of 6 ms between a PUSCH and a PHICH transmitted based on the same.

As the TDD-FDD CA is introduced, the present invention provides a new timing of a TPC command.

In particular, when cross-carrier scheduling between a TDD carrier and a FDD carrier is configured for a UE, a timing that is different from an existing scheduling timing and a HARQ-ACK timing may be applied to the UE.

The existing TPC command timing supports CA of carriers having identical or different TDD UL/DL configurations and CA of FDD carriers, as shown in Equation 4, Equation 5, and the descriptions thereof. However, when the TDD-FDD CA is configured for a UE, the case in which a timing that is different from the existing scheduling timing and HARQ-ACK timing is applied to the UE, is not taken into consideration. Therefore, when the existing timing of a TPC command that was applied for the UE that is connected with a FDD carrier or a TDD carrier, is applied, an uplink power control is erroneously indicated with respect to a subframe in which the UE does not execute uplink transmission, a power control based on an erroneous value may be indicated, or the like. In particular, when a TDD carrier is a scheduling cell (serving cell) and a FDD carrier is a scheduled cell (serving cell), a problem may arise.

Figure 5:
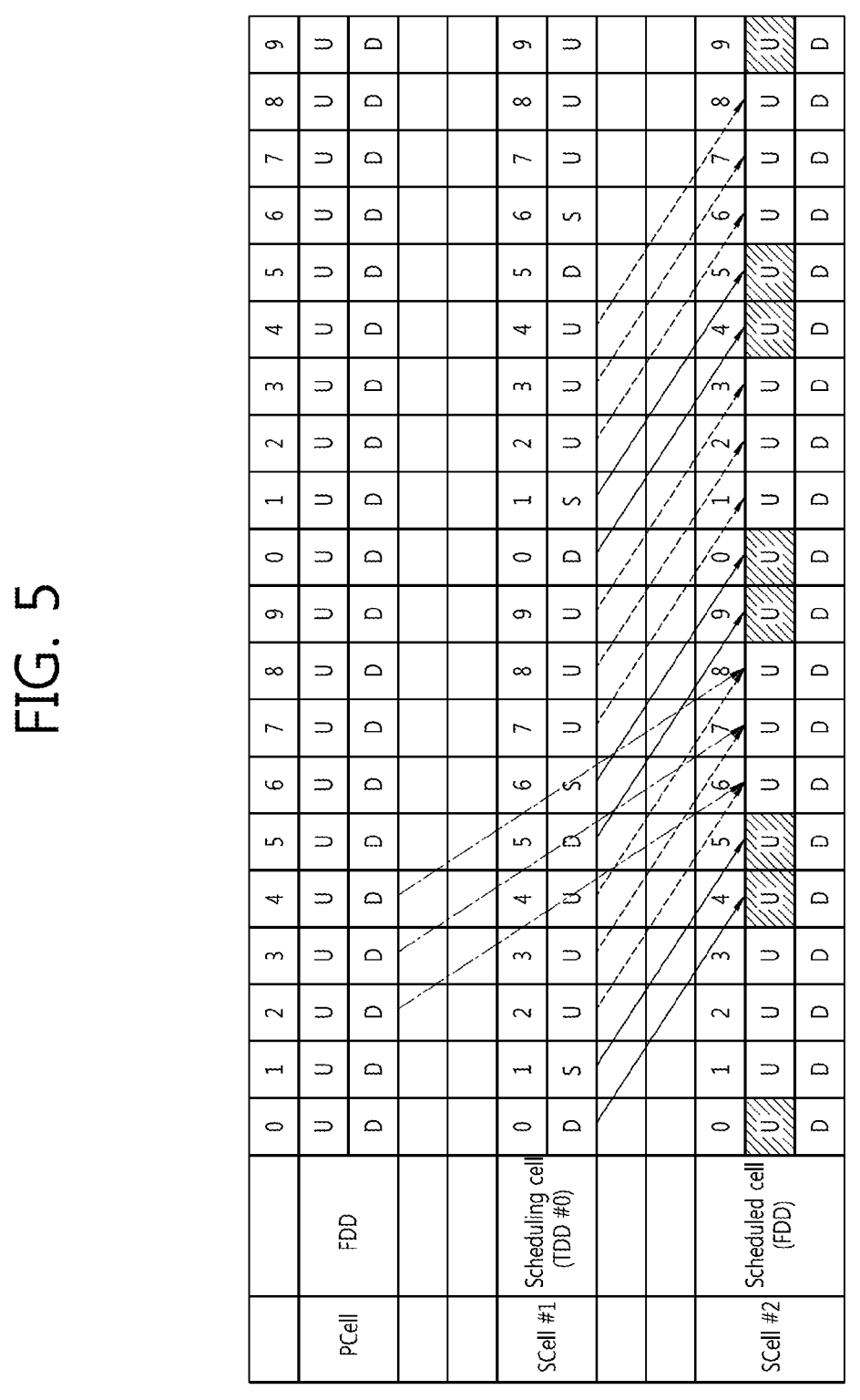

FIG. 5 is a diagram illustrating an example of an uplink scheduling timing and a TPC command timing for an SCell #2 of a UE for which CA of a FDD-based PCell, a TDD-based SCell #1, and a FDD-based SCell #2 is configured and cross-carrier scheduling is configured over the TDD-based SCell #1, according to one or more exemplary embodiments. FIG. 5 shows the case in which the SCell #1 is a scheduling cell, the SCell #2 is a scheduled cell, and the SCell #1 is configured as a TDD UL/DL configuration 0.

Referring to FIG. 5, a solid line arrow indicates an (uplink) PUSCH scheduling, a broken line arrow indicates a PUSCH scheduling based on an existing scheduling timing, and an alternate long and short dash line arrow indicates a TPC command associated with a corresponding PUSCH transmission based on DCI format 3/3A transmitted over a common search space of a PCell. Considering a scheduling timing for TDD-FDD CA in which a scheduling cell is TDD and a scheduled cell is FDD, only UL subframes 0, 4, 5, and 9 which are filled with a pattern of oblique lines of the SCell #2 (scheduled cell, FDD) are UL subframes that may be scheduled through the SCell #1 (scheduling cell, TDD). However, when the existing TPC command timing is applied, a UE for which a TDD-FDD CA is configured may execute unnecessary TPC command reception and unnecessary PUSCH power control adjustment state accumulation (for example, when a TPC command is received through DCI format 3/3A) for the situation where a PUSCH transmission is not expected, considering the absence of a DL subframe for transferring a PDCCH/EPDCCH on a TDD scheduling cell, a UL HARQ timing of a FDD scheduled cell, applied due to the absence, and the like. The unnecessary operations of the UE may undesirable, from the perspective of transmission efficiency and saving in a battery of the UE. There is a desire for a new timing of a TPC command, designed considering TDD-FDD CA and cross-carrier scheduling.

Therefore, when TDD-FDD CA is configured for a UE and cross-carrier scheduling in which a TDD cell is a scheduling cell and a FDD cell is a scheduled cell, is configured, the present invention provides a TPC command timing for the UE, as shown in Table 6 and Table 7, provided below.

TABLE 6

When TDD-FDD CA is configured for a UE, and cross-carrier scheduling in which a scheduling cell is TDD and a scheduled cell is FDD, is configured for the UE, $K_{PUSCH}$ for the FDD scheduled cell is given as in Table 7, provided below.

TABLE 7

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 4 | — | — | — | 4 | 4 | — | — | — | 4 |
| 1 | 4 | — | — | 4 | 4 | 4 | — | — | 4 | 4 |
| 2 | 4 | — | 4 | 4 | 4 | 4 | — | 4 | 4 | 4 |
| 3 | 4 | 4 | 4 | 4 | 4 | 4 | — | — | — | 4 |
| 4 | 4 | 4 | 4 | 4 | 4 | 4 | — | — | 4 | 4 |
| 5 | 4 | 4 | 4 | 4 | 4 | 4 | — | 4 | 4 | 4 |
| 6 | 4 | — | — | 4 | 4 | 4 | — | — | — | 4 |

Table 7 lists $K_{PUSCH}$ for the FDD scheduled cell, based on the TDD UL/DL configuration of the TDD scheduling cell that carries the TPC command. Here, a subframe number i indicates a subframe number of a scheduled cell where a PUSCH transmission is executed, and $K_{PUSCH}$ denotes a factor for indicating a subframe number of a scheduling cell through which a TPC command associated with a corresponding PUSCH transmission is transferred. That is, a TPC command associated with a PUSCH transmission is transferred in the subframe number (i-$K_{PUSCH}$) of a scheduling cell.

Based on $K_{PUSCH}$ in the newly provided Table 6 and Table 7, an optimal TPC command timing may be indicated for a UE for which cross-carrier scheduling in which a TDD cell is a scheduling cell and a FDD cell is a scheduled cell, is configured.

Figure 6:
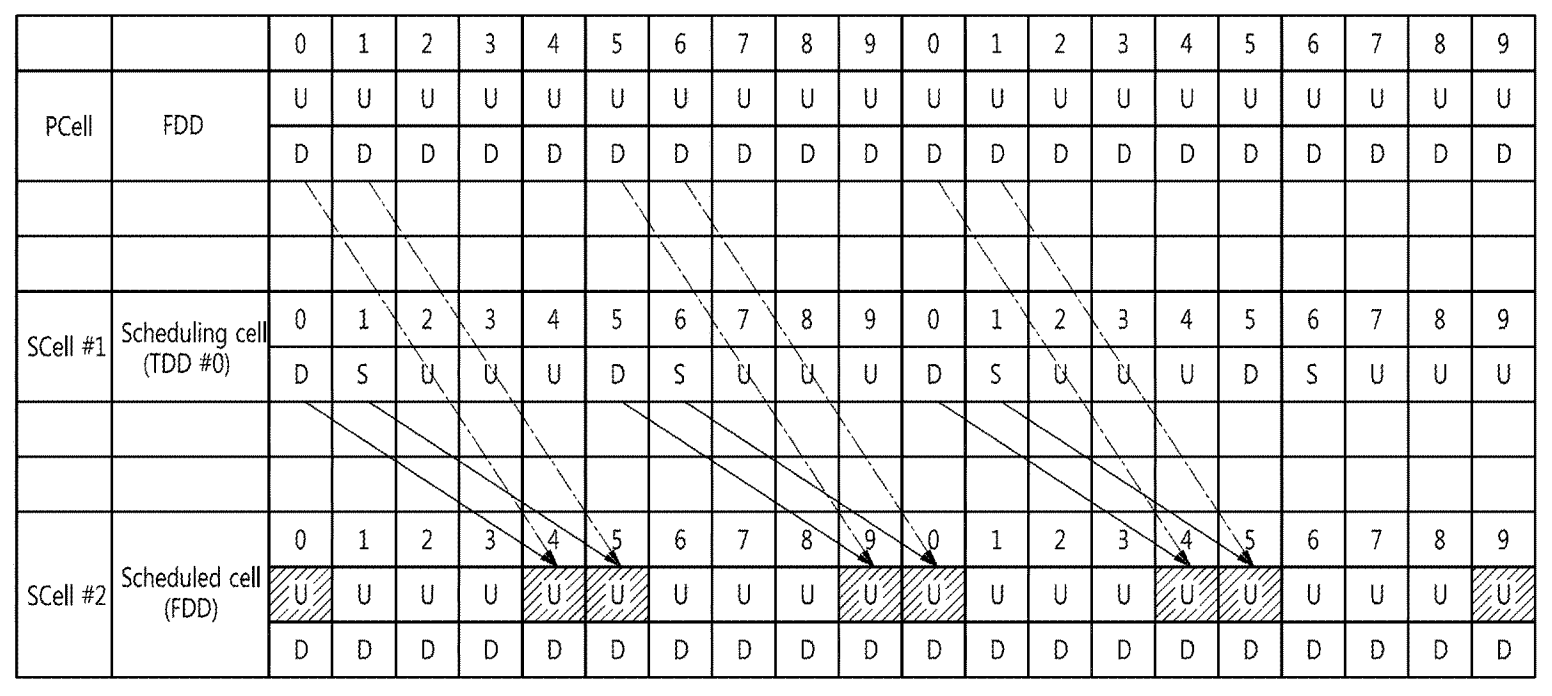

FIG. 6 is a diagram illustrating an example of an uplink scheduling timing and a TPC command timing according to the present invention. Referring to FIG. 6, based on the provided TPC command timing, an effective TPC transmission may be allowed based on a subframe of a FDD scheduled cell, in which a PUSCH transmission is actually executed, and unnecessary operations of a UE and battery consumption may be minimized. In addition, more effective PUSCH transmission power control may be executed.

Figure 7:
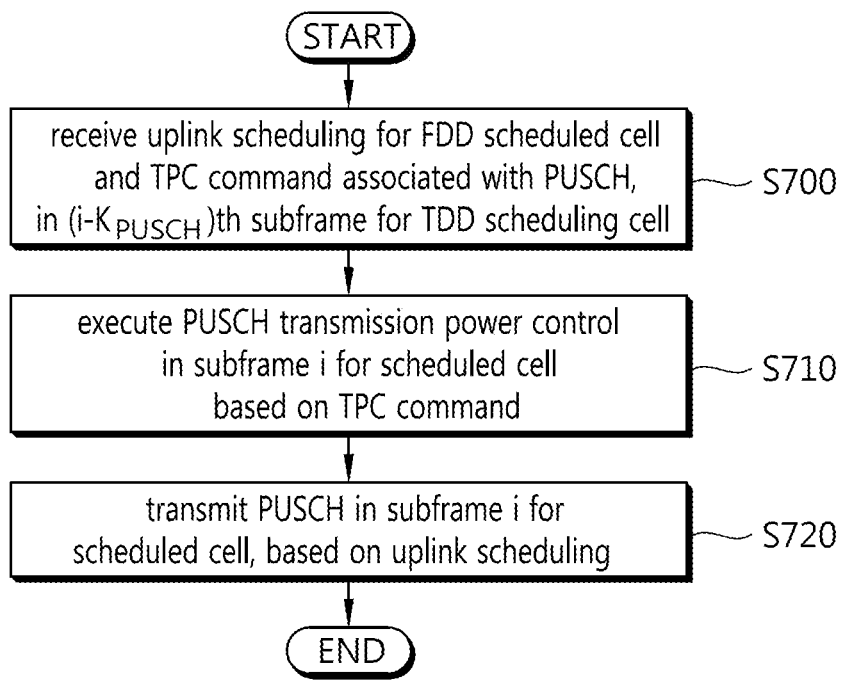
FIG. 7 is a diagram illustrating an example of a PUSCH transmission power controlling method executed by a UE for which CA of a TDD-based scheduling cell and a FDD-based scheduled cell is configured, according to one or more exemplary embodiments.

FIG. 7 is a diagram illustrating an example of a PUSCH transmission power controlling method executed by a UE for which CA of a TDD-based scheduling cell and a FDD-based scheduled cell is configured, according to the present invention.

A UE receives uplink scheduling for a scheduled cell and a TPC command associated with a PUSCH, in a $(i-K_{PUSCH})^{th}$ subframe of a scheduling cell, in operation S700. The uplink scheduling may be received through a PDCCH/EPDCCH with DCI format0/4 for the scheduled cell. The TPC command may be received through a PDCCH or an EPDCCH. In this instance, the TPC command may be included in a PDCCH/EPDCCH with DCI format 0 or 4 (0/4) for the scheduled cell, or may be jointly coded with other TPC commands in a PDCCH with DCI format 3/3A for the scheduled cell. $K_{PUSCH}$ is an index indicating a subframe number (or index) and a timing of a TPC command based on the TDD UL/DL configuration of the scheduling cell. Specifically, $K_{PUSCH}$ is an offset between a subframe in which a TPC command is transmitted and a subframe in which a PUSCH associated with the TPC command is transmitted. The offset may be indicated as a subframe number offset as shown in e.g., Table 7. $K_{PUSCH}$ may be given based on Table 7.

The UE executes PUSCH transmission power control in a subframe i for the scheduled cell based on the TPC command in operation S710. In this instance, the UE may determine a PUSCH power control adjustment state using Equation 4 or 5, based on the TPC command. The UE may execute PUSCH transmission power control using Equation 1, 2, or 3, based on the PUSCH power control adjustment state, and may determine a UE transmission power for a PUSCH transmission in a subframe i for the scheduled cell.

The UE transmits the PUSCH in the subframe i for the scheduled cell, based on the uplink scheduling in operation S720. In this instance, the UE generates the PUSCH, and transmits the PUSCH based on the UE transmission power for the PUSCH transmission in the subframe i for the scheduled cell.

Figure 8:
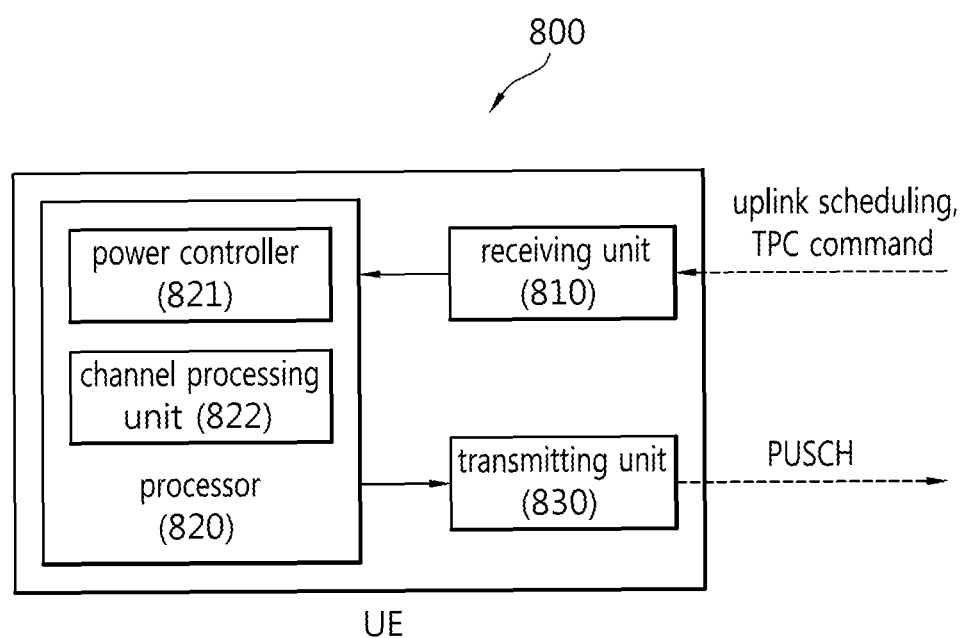
FIG. 8 is a block diagram illustrating a UE according to one or more exemplary embodiments.

FIG. 8 is a block diagram illustrating a UE according to the present invention.

Referring to FIG. 8, a UE 800 includes a receiving unit 810, a processor 820, and a transmitting unit 830. The processor 820 executes processing and a control for operations of the present invention. The processor 820 may include a power controller 821 and a channel processing unit 822.

The receiving unit 810 receives, from an eNB, uplink scheduling for the scheduled cell and a TPC command associated with a PUSCH, in a $(i-K_{PUSCH})^{th}$ subframe of the scheduling cell. The receiving unit 810 may receive the uplink scheduling through a PDCCH/EPDCCH of DCI format 0/4 having a CIF value for the scheduled cell. The receiving unit 810 may receive the TPC command through a PDCCH or an EPDCCH. In this instance, the TPC command may be included in a PDCCH/EPDCCH with DCI format 0 or 4 (0/4) for the scheduled cell, or may be jointly coded with other TPC commands in a PDCCH with DCI format 3/3A for the scheduled cell. $K_{PUSCH}$ is an index indicating a subframe number (or index) and a timing of a TPC command based on the TDD UL/DL configuration of the scheduling cell. $K_{PUSCH}$ may be given based on Table 7.

The power controller 821 executes PUSCH transmission power control in a subframe i for the scheduled cell based on the TPC command in operation. In this instance, the power controller 821 may determine a PUSCH power control adjustment state using Equation 4 or 5, based on the TPC command. The power controller 821 may execute PUSCH transmission power control using Equation 1, 2, or 3, based on the PUSCH power control adjustment state, and may determine a UE transmission power for a PUSCH transmission in a subframe i for the scheduled cell.

The channel processing unit 822 may generate the PUSCH based on the uplink scheduling.

The transmitting unit 830 may transmit the PUSCH in the subframe i for the scheduled cell. In this instance, the transmitting unit 830 may transmit the PUSCH based on an intensity of the UE transmission power for the PUSCH transmission in the subframe i for the scheduled cell.

Further, in a TDD-FDD or FDD-TDD configuration, a UE may receive and detect a TPC command for a serving cell based on the following examples. The UE may establish an RRC connection with an eNodeB through a first serving cell. The first serving cell may be operated in a TDD mode. Further, the first serving cell may be a primary serving cell (PCell). However, according to one or more exemplary embodiments, the first serving cell may be a scheduling SCell. The second serving cell may be a scheduled SCell. The UE may receive an RRC message through the first serving cell. The RRC message may include CA configuration information including information of a second serving cell supporting an FDD mode. The first serving cell and the second serving cell may be aggregated by a TDD-FDD CA scheme. The UE may receive and detect a PDCCH transmitted through e.g., the first serving cell in subframe $n-K_{PUSCH}$. The PDCCH may include a TPC command. The TPC command may indicate a transmit power of a PUSCH transmission on the second serving cell, and the transmission of the PUSCH is transmitted in subframe n. The $K_{PUSCH}$ may be 4 when the TDD-FDD CA configuration is established and the first serving cell's PDCCH controls the transmission power of PUSCH on the second serving cell. After detecting the TPC command from the PDCCH, the UE may transmit the PUSCH associated with the TPC command through the second serving cell in the subframe n.

The index n of a subframe may be one of 0, 1, 2, . . . , and 9 when a radio frame format includes 10 subframes. If $n-K_{PUSCH}$ is a negative value, the subframe $n-K_{PUSCH}$ indicates $10+n-K_{PUSCH}$ of the previous radio frame. For example, if the PUSCH is transmitted in subframe 3 of radio frame 2 and $K_{PUSCH}$ is 4, the TPC command may be received in subframe 9 of radio frame 1.

The cross-carrier scheduling between the first serving cell and the second serving cell may be configured by an RRC signaling through the first serving cell. Further, the subframe $n-K_{PUSCH}$ for the transmission of the PDCCH comprising the TPC command may be determined based on a TDD UL/DL configuration of the first serving cell. For example, in a radio frame, a number of subframes available for the transmission of the PDCCH comprising the TPC command may be determined based on the TDD UL/DL configuration of the first serving cell, and the subframe $n-K_{PUSCH}$ may be determined from among the available subframes.

According to one or more exemplary embodiments, the PUSCH transmission on the second serving cell may be available in subframe 0, subframe 4, subframe 5, and subframe 9 for all TDD UL/DL configuration of the first serving cell. Further, with respect to subframe 6, a TPC command may not be available to indicate the transmit power of the PUSCH transmission in the subframe 6. The PDCCH may include a downlink control information (DCI) format 0 or a DCI format 4. The transmit power of the PUSCH transmission may be controlled based on a transmit power parameter included in the DCI format 0 or a transmit power parameter included in the DCI format 4. The equation 4 may be used for DCI format 0 configuration and the equation 5 may be used for DCI format 0/4 configuration.

The above description is to explain exemplary embodiments of inventive concept, and it will be apparent to those skills in the art that modifications and variations can be made without departing from the spirit and scope of inventive concept. Thus, it is intended that the present invention cover the modifications and variations of exemplary embodiments provided they come within the scope of the appended claims and their equivalents.

What is claimed is:

1. A User Equipment (UE) to receive a transmit power control (TPC) command in a wireless communication system supporting Time Division Duplex (TDD)-Frequency Division Duplex (FDD) Carrier Aggregation (CA), the UE comprising:
a processor to control a Radio Resource Control (RRC) connection with a base station through a first serving cell supporting a TDD mode, and to detect a Physical Downlink Control Channel (PDCCH) transmitted through the first serving cell, the PDCCH comprising a Transmit Power Control (TPC) command and being received in a subframe n−4;
a receiver to receive an RRC message through the first serving cell, the RRC message comprising carrier aggregation (CA) configuration information, the CA configuration information comprising information of a second serving cell supporting an FDD mode, and the first serving cell and the second serving cell being aggregated by a TDD-FDD CA scheme; and
a transmitter to transmit, from the UE, a Physical Uplink Shared Channel (PUSCH) associated with the TPC command through the second serving cell, the PUSCH being transmitted in a subframe n.

2. The UE of claim 1, wherein:
the processor determines a transmit power of the PUSCH based on the TPC command; and
the TPC command indicates the transmit power of the PUSCH on the second serving cell.

3. The UE of claim 1, wherein three subframes exist between the subframe n and the subframe n−4, and
wherein the three subframes include a subframe n−1, a subframe n−2, and a subframe n−3.

4. The UE of claim 1, wherein the first serving cell is a primary serving cell (PCell), and the second serving cell is a secondary serving cell (SCell).

5. The UE of claim 1, wherein:
the processor controls an establishment of a cross-carrier scheduling for the second serving cell; and
the second serving cell is a scheduled cell, which is scheduled by the first serving cell.

6. The UE of claim 1, wherein the PDCCH corresponds to a PDCCH or an Enhanced PDCCH (EPDCCH).

7. The UE of claim 6, wherein a cross-carrier scheduling between the first serving cell and the second serving cell is configured by an RRC signaling through the first serving cell.

8. The UE of claim 1, wherein the subframe n−4 for the transmission of the PDCCH comprising the TPC command is determined based on a TDD Uplink(UL)/Downlink(DL) configuration of the first serving cell.

9. The UE of claim 1, wherein:
in a radio frame, a number of subframes available for the transmission of the PDCCH comprising the TPC command is determined based on a TDD Uplink(UL)/Downlink(DL) configuration of the first serving cell; and
the subframe n−4 is determined from among the available subframes.

10. The UE of claim 1, wherein regardless of a value of a TDD UL/DL configuration of the first serving cell, the PUSCH transmission on the second serving cell is available in subframe 0, subframe 4, subframe 5, and subframe 9, and
wherein for a PUSCH transmission in a subframe 6, the TPC command is not available.

11. The UE of claim 1, wherein the PDCCH comprises a downlink control information (DCI) format 0 or a DCI format 4.

12. The UE of claim 11, wherein the processor controls a transmit power of the PUSCH transmission based on a transmit power parameter included in the DCI format 0 or a transmit power parameter included in the DCI format 4.

13. A base station to control a transmit power control (TPC) command in a wireless communication system supporting Time Division Duplex (TDD)-Frequency Division Duplex (FDD) Carrier Aggregation (CA), the base station comprising:
a processor to control a Radio Resource Control (RRC) connection with a User Equipment (UE) through a first serving cell supporting a TDD mode, and to determine a transmit power of a Physical Uplink Shared Channel (PUSCH) transmission of the UE;
a transmitter to transmit, to the UE, an RRC message through the first serving cell, and to transmit, to the UE, a Physical Downlink Control Channel (PDCCH) through the first serving cell, the RRC message comprising carrier aggregation (CA) configuration information, the CA configuration information comprising information of a second serving cell supporting an FDD mode, the first serving cell and the second serving cell being aggregated by a TDD-FDD CA scheme, and the PDCCH comprising a TPC command and being transmitted in a subframe n−4; and
a receiver to receive, from the UE, the PUSCH associated with the TPC command through the second serving cell, the PUSCH being transmitted in a subframe n.

14. The base station of claim 13, wherein:
the processor determines the transmit power of the PUSCH transmission based on a location of the UE; and
the TPC command indicates the transmit power of the PUSCH on the second serving cell.

15. The base station of claim 13, wherein three subframes exist between the subframe n and the subframe n−4, and
wherein the three subframes include a subframe n−1, a subframe n−2, and a subframe n−3.

16. The base station of claim 13, wherein the first serving cell is a primary serving cell (PCell), and the second serving cell is a secondary serving cell (SCell).

17. The base station of claim 13, wherein:
the processor controls an establishment of a cross-carrier scheduling for the second serving cell; and
the second serving cell is a scheduled cell, which is scheduled by the first serving cell.

18. The base station of claim 13, wherein the PDCCH corresponds to a PDCCH or an Enhanced PDCCH (EPDCCH).

19. The base station of claim 18, wherein a cross-carrier scheduling between the first serving cell and the second serving cell is configured by an RRC signaling through the first serving cell.

20. The base station of claim 13, wherein the subframe n−4 for the transmission of the PDCCH comprising the TPC command is determined based on a TDD Uplink(UL)/Downlink(DL) configuration of the first serving cell.

21. The base station of claim 13, wherein:
in a radio frame, a number of subframes available for the transmission of the PDCCH comprising the TPC command is determined based on a TDD Uplink(UL)/Downlink(DL) configuration of the first serving cell; and
the subframe n−4 is determined from among the available subframes.

22. The base station of claim 13, wherein regardless of a value of a TDD UL/DL configuration of the first serving cell, the PUSCH transmission on the second serving cell is available in subframe 0, subframe 4, subframe 5, and subframe 9, and
wherein for a PUSCH transmission in a subframe 6, the TPC command is not available.

23. A system for a User Equipment (UE) to receive a transmit power control (TPC) command in a wireless communication system supporting Time Division Duplex (TDD)-Frequency Division Duplex (FDD) Carrier Aggregation (CA), the system comprising:
a processor to control a Radio Resource Control (RRC) connection with a base station through a first serving cell supporting a TDD mode, and to detect a Physical Downlink Control Channel (PDCCH) transmitted through the first serving cell, the PDCCH comprising a Transmit Power Control (TPC) command and being received in a subframe n−4,
wherein the processor processes an RRC message received through the first serving cell, the RRC message comprising carrier aggregation (CA) configuration information, the CA configuration information comprising information of a second serving cell supporting an FDD mode, and the first serving cell and the second serving cell being aggregated by a TDD-FDD CA scheme, and
wherein the processor generates a Physical Uplink Shared Channel (PUSCH) associated with the TPC command to be transmitted through the second serving cell, the PUSCH being configured to be transmitted in a subframe n.

* * * * *